United States Patent [19]
Partee

[11] Patent Number: 6,081,408
[45] Date of Patent: Jun. 27, 2000

[54] MAGNETORESISTIVE READ/WRITE HEAD HAVING REDUCED WRITE FRINGING AND METHOD FOR MANUFACTURING SAME

[75] Inventor: Charles Partee, Boulder, Colo.

[73] Assignee: Masushita-Koto Buki Electronics Industries, Ltd., Ehime, Japan

[21] Appl. No.: 08/982,542

[22] Filed: Dec. 2, 1997

[51] Int. Cl.[7] .............................. G11B 5/127; G11B 5/39
[52] U.S. Cl. ................................... 360/113; 29/603.15
[58] Field of Search .................................. 360/113, 125; 29/603.15

[56] References Cited

U.S. PATENT DOCUMENTS

| | | | |
|---|---|---|---|
| 5,668,689 | 9/1997 | Schultz et al. | 360/113 |
| 5,707,538 | 1/1998 | Shen et al. | 360/113 |
| 5,751,526 | 5/1998 | Schemmel | 360/113 |
| 5,805,392 | 9/1998 | Mallary et al. | 360/113 |

Primary Examiner—George J. Letscher
Attorney, Agent, or Firm—William J. Kubida, Esq.; Hogan & Hartson LLP

[57] ABSTRACT

A method of forming a top pole member in a magnetic recording head having a bottom pole member, an insulating layer on said bottom pole member, and a shared pole member over the bottom pole member on a ceramic substrate comprises the steps of depositing a ferromagnetic material on the shared pole portion forming a shared pole tip; depositing an insulating layer on and over the shared pole and the shared pole tip; mechanically forming a planar insulating layer surface over the shared pole member exposing the shared pole tip flush with said planar surface; recessing the pole tip below said planar surface; depositing a gap layer over the planar surface of the insulating layer and the recessed pole tip. This layer forms a channel over the recessed pole tip. The top pole member is then deposited into and over the channel over the recessed pole tip. The top pole tip thus formed is automatically centered and aligned with the shared pole tip without the necessity of ion beam milling.

16 Claims, 3 Drawing Sheets

MAGNETORESISTIVE READ/WRITE HEAD HAVING REDUCED WRITE FRINGING AND METHOD FOR MANUFACTURING SAME

BACKGROUND OF THE INVENTION

1. Field of the Invention

This invention relates generally to the field of magnetic data transducers and methods for manufacturing such transducers, and more particularly to a process for producing a write element in a magnetoresistive (MR) read/write head having special utility in conjunction with shared, or merged, shields on magnetoresistive read/write heads.

2. Description of the Related Art

Magnetoresistive ("MR") heads for disk and tape media comprise separate read and write head elements formed over each other and generally sharing certain common material layers. The read element usually consists of an alloy film such as nickel-iron ("NiFe") that exhibits a change in resistance in the presence of a magnetic field spaced between shielding layers which protect the MR elements from other magnetic fields, such as those from the associated write head element or adjacent written track fields.

The write head element of an MR head is designed much the same way as a thin-film inductive head. It generally comprises two magnetic-pole pieces that are typically made of permalloy, a soft magnetic material. These pole pieces have spaced pole tips and are connected to either at the ends opposite the tips. A deposited-layer copper coil is formed around one of the pole pieces. When an electrical current is supplied to the coil, the connected pole pieces act as an electromagnet core producing a magnetic field across the gap between the two spaced tips of the pole pieces which are held adjacent the recordable magnetic media surface. The magnetic fringe field associated with that gap is used to write data onto the magnetic storage media (disk or tape) by reversing the direction of the magnetic fields on the media surface. The number of turns in the write head coil may be as few as ten or less and the lower inductance this affords over the greater number of turns required in conventional thin-film heads makes it easier to write the signal to the media at very high data frequencies.

Conventionally, thin film heads for both disk and tape media have traditionally maintained the width of the top pole narrower than the width of the shared or bottom pole so that it fits in its entirety on top of the shared or bottom pole. This results, however, in magnetic field contours which are curved outward around the edges of the narrower top pole.

Write operations occur at the trailing or top pole of the write head because the field generated by the head in front of the write gap can change the direction of the magnetization of the media when the media is in front of the gap. Resultantly, there exists a region in front of the gap where the field generated by the head exceeds the coercivity of the media. This is commonly referred to as the "write-bubble". The track width is the width of this bubble transverse to the direction of relative motion between the media and the head. If the direction of the field generated by the head changes, it will change the direction of magnetization of the section of the media that is inside this write-bubble. As the magnetic media moves away from the gap, it is no longer influenced by the field generated there, so the direction of magnetization in the media will remain the same as it is when it leaves the write bubble. Therefore, the shape of the field contour and the field gradient are most critical over the trailing edge pole, i.e. the top pole, since that is where the magnetization in the media is set. Since writing, or encoding, of data occurs as the media moves past the region of the trailing edge of the top pole, the written transitions are curved at the track edges.

On typical MR heads, the write and read elements are separate, but utilize a common shared pole. The trailing edge pole is the top pole of the write element. The bottom pole of the write element is the shared shield. This shared shield is also one pole sandwiching the MR element, with a bottom pole being the shield on the other side of the MR element.

Since the track width is determined by the write element width and more particularly by the width of the trailing, or top pole, the active shape and dimensions of this top pole are critical As head size continues to decrease in an effort to achieve higher and higher data storage capacities, the accuracy requirements for pole tip width continues to increase. Recently, formation of a stepped pole tip configuration on the shared shield has been used in order to reduce fringing. Such a fringing enhanced write transducer is disclosed in U.S. patent application Ser. No. 08/461,411 filed Jun. 5, 1995, and hereby incorporated by reference in its entirety.

The top pole tip width of the MR head essentially determines the track width. The alignment of the top pole with the stepped pole tip on the shared shield also affects the track width. In order to optimally minimize the track width, the difference between the top pole width and the shared shield pole tip width should be close to zero. In addition, the top pole needs to be accurately aligned with the stepped pole tip on the shared shield. As head size continues to decrease, and thus top pole width continues to decrease, the effect of alignment errors between the poles become an even more important consideration in minimizing the track width. Therefore there is a need to ensure correct alignment between the stepped shared pole and the top pole.

One solution has been to deposit the top pole and then use the top pole as a template for ion milling the stepped pole tip of the shared shield. This method has the disadvantage of depositing ablated shared shield material at undesirable locations, such as on the sides of the gap material and the top pole. Thus there is a need for a way to accurately align the top pole with the stepped pole tip on the shared shield without the undesirable deposition of ablated material and additional ion milling steps.

SUMMARY OF THE INVENTION

It has been found that placement of the top pole tip edge width directly adjacent the write gap and accurately aligned with the stepped pole tip is critical to minimizing the track width. The present invention is a method of ensuring that this critical placement of the top pole edge adjacent the gap between the top pole and the step on the shared shield are automatically aligned.

In the method of the present invention, the shared shield, the MR element and the bottom shield are formed via photolithographic techniques in a conventional manner. After the bottom pole, MR Element and shared shield are formed on the wafer substrate, a photoresist is applied to the upper surface of the shared shield, an appropriate mask applied to outline a shared pole tip, and the photoresist exposed to light. The exposed photoresist is then removed leaving behind a template of exposed shared shield surface. The shared pole tip, typically formed of a nickel iron alloy, is then deposited on the exposed surface of the shared shield and the remaining resist removed. Next, an insulating layer such as aluminum oxide is deposited over the shared pole tip and the shared shield. Then the covered surface of the shared shield is lapped, i.e., planarized to produce a uniform flat surface with the end surface of the newly formed shared pole tip exposed flush and coextensive with the insulating alumina surface. Next, a generally uniform planar ion beam etch is applied to the entire surface of the lapped surface to etch away a portion of both the nickel iron of the shared pole tip and the insulating layer of alumina over the shared shield. Since the etch rate for NiFe is greater than that of the alumina, the pole tip becomes recessed below the machined surface of the alumina. In addition, the upper side walls of the aluminum oxide layer adjacent the removed portion of the shared pole tip become worn back, i.e. tapered away from the pole tip and the upper corners become rounded. This ion beam etch results in a trough in the alumina being created over the now recessed shared shield pole tip in which the bottom of the trough is the pole tip and the side walls of the trough are accurately aligned with the shared shield pole tip. Next, a uniform thickness gap layer of aluminum oxide is uniformly deposited over the ion beam etched surface and the recessed shared shield pole tip. The gap layer thus formed has a recessed portion in the trough formed over the shared shield pole tip. This recessed portion is automatically aligned with the top of the shared shield pole tip.

Next, a photoresist mask for the top pole is applied over the gap layer and then the top pole is electroplated in place. The top pole thus formed extends over and follows the gap layer contour into the recessed portion of the gap layer. The top pole thus has an edge of the top pole tip immediately above the shared pole tip and is automatically aligned with the underlying shared pole tip. This arrangement eliminates the necessity of an additional process, such as focused ion beam (FIB) milling on the shared shield, mentioned above, to accurately align the top pole with the pole tip on the shared pole.

The top pole thus formed effectively has a narrow edge automatically accurately aligned opposite the shared shield pole tip which ensures that unwanted "smilies" or fringing magnetic fields are minimized and the track width is most accurately and precisely maintained.

BRIEF DESCRIPTION OF THE DRAWINGS

The aforementioned and other features and objects of the present invention and the manner of attaining them will become more apparent and the invention itself will be best understood by reference to the following description of a preferred embodiment of the invention taken in conjunction with the accompanying drawings, wherein.

DETAILED DESCRIPTION OF THE INVENTION

Figure 1:
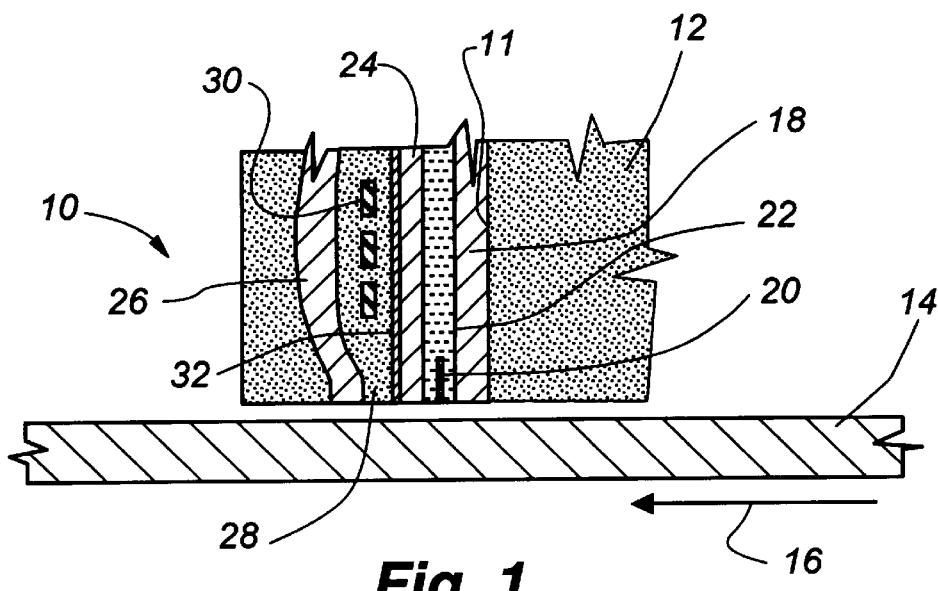
FIG. 1 is a simplified, cross-sectional elevational view of an MR read/write head in accordance with the present invention illustrating a relatively planar bottom pole or shield, a MR sensing material, a shared shield, a number of coil turns and a top pole formed thereover with the direction of the media movement as shown by the arrow such that the top pole is the "trailing edge" pole.

Referring now to FIG. 1, a partial vertical sectional view through a magnetoresistive read/write head 10 in accordance with the invention is shown. The head 10 is formed by photolithography techniques on the trailing end surface 11 of air bearing slider block 12. In FIG. 1, the slider 12 is shown with its air bearing underside surface adjacent the magnetic media on the upper side of a rotating data storage disk 14 rotating in the direction of the arrow 16.

The head 10 has a bottom shield 18 formed on the end surface 11, a magnetoresistive element 20 suspended in an insulating layer 22 between the bottom shield 18 and a shared shield 24, a top pole 26 spaced from the shared shield 24 by a gap 28, and a conductor coil 30 formed around the top pole 26. Between the gap 28 and the shared shield 24 is a raised shared pole tip 32.

Formation of the head 10 is conventional through the formation of the shared shield 24. Simply stated, a photoresist for the bottom shield is deposited on a wafer of slider material, then the bottom shield is deposited and the photoresist removed. Next an insulating layer of alumina is formed upon which another photoresist for the deposition of the magnetoresistive element is laid. The MR element 20 is then formed, the photoresist removed, another portion of the insulating layer 22 deposited and the shared shield 24 formed upon the insulating layer 22.

Figure 2A:
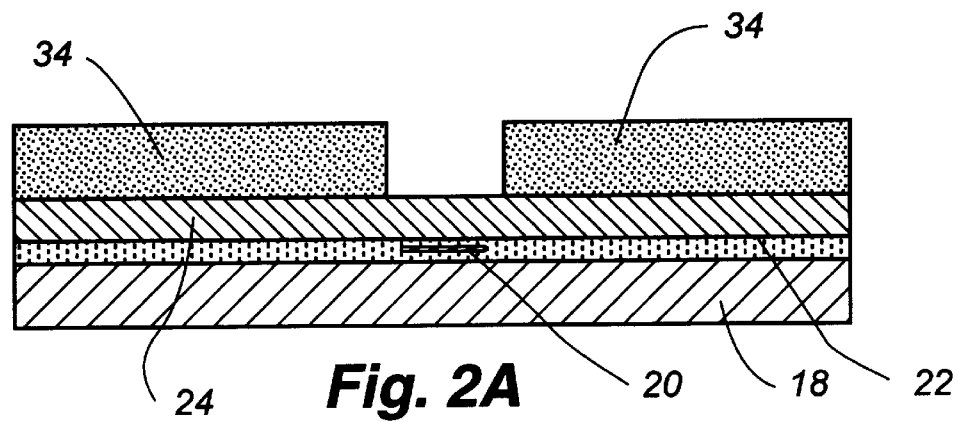
FIG. 2A is a cross sectional view of a partially formed MR head with the bottom shield, magnetoresistive read element and shared shield already formed and a photo resist deposited on the shared shield outlining the location of a raised shared pole tip.
Figure 2B:
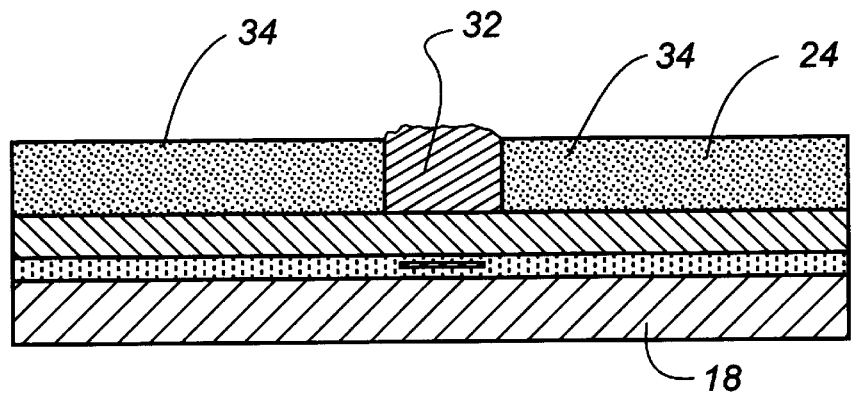
FIG. 2B is a cross sectional view of the partially formed MR head as in FIG. 2A with the addition of a shared shield pole tip deposited thereon.
Figure 2C:
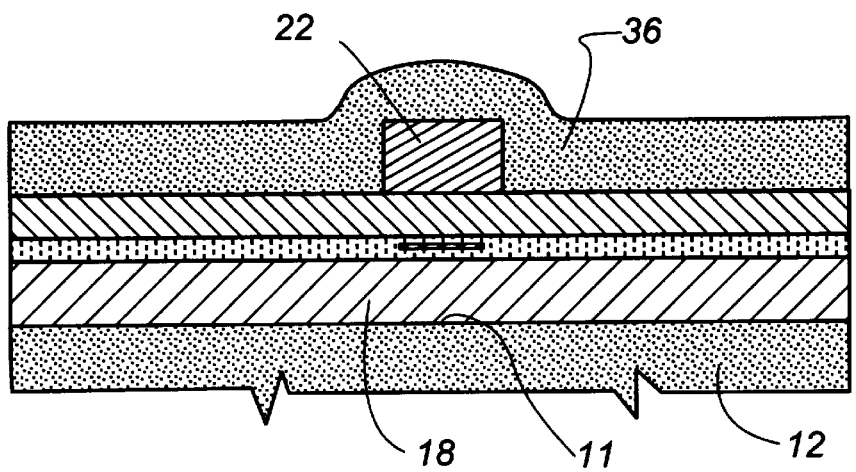
FIG. 2C is a cross sectional view of the partially formed MR head as in FIG. 2B after removal of the photo resist and an insulating layer deposited thereon over the shared shield.
Figure 2D:
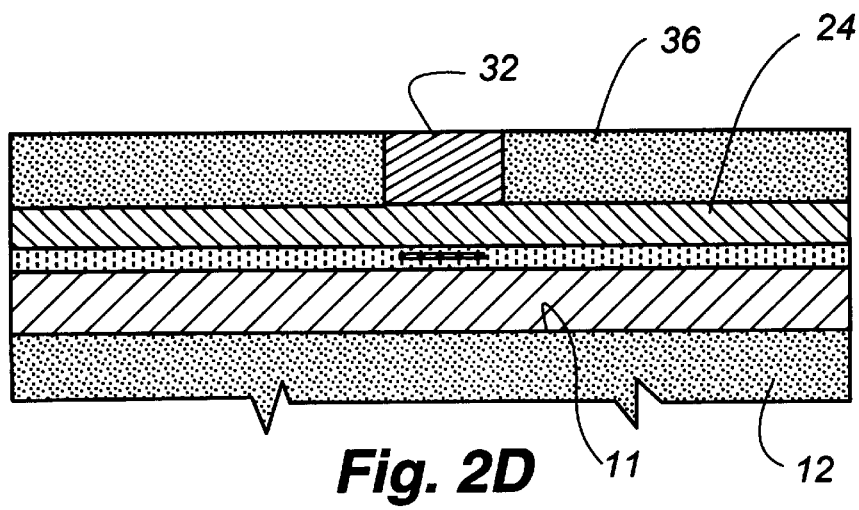
FIG. 2D is a cross sectional view of the partially formed MR head as in FIG. 2C after lapping the surface of the insulating layer.

At this point, formation of the head 10 in accordance with the invention departs from conventional techniques. First, a photoresist 34, either positive or negative, is deposited on the shared shield 24, masked appropriately, exposed to UV light, and then either the exposed or unexposed portions of the resist are removed, depending on the type of resist used, to outline a raised shared shield pole tip location as is shown in FIG. 2A. Then the shared shield pole tip 32 is electrodeposited as is shown in FIG. 2B. This tip 32 may be the same material as the shared shield or may be a material having a higher magnetic moment such as NiFe. The photoresist 34 is then removed and an insulating layer 36, preferably alumina, is deposited over the entire surface covering the pole tip 32 and the shared shield 24 as is shown in FIG. 2C.

Figure 2E:
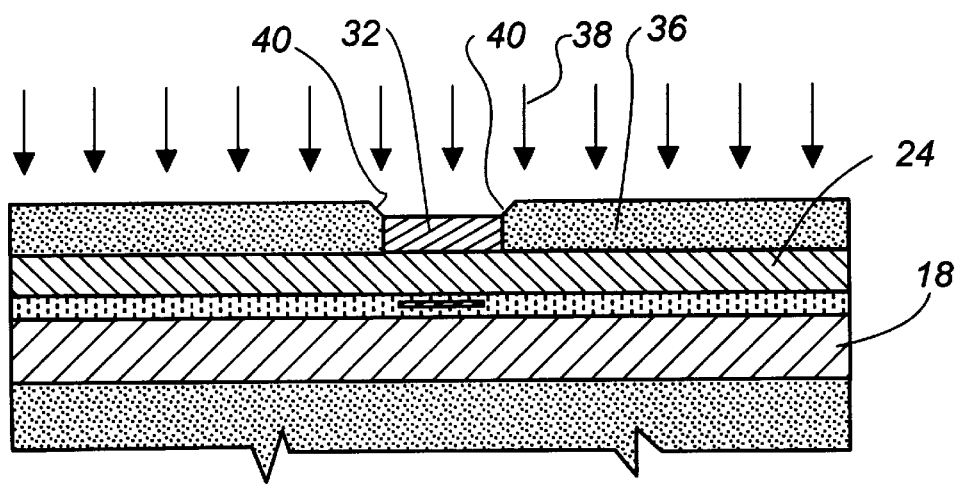
FIG. 2E is a cross sectional view of the partially formed MR head as in FIG. 2D after ion beam etching.
Figure 2F:
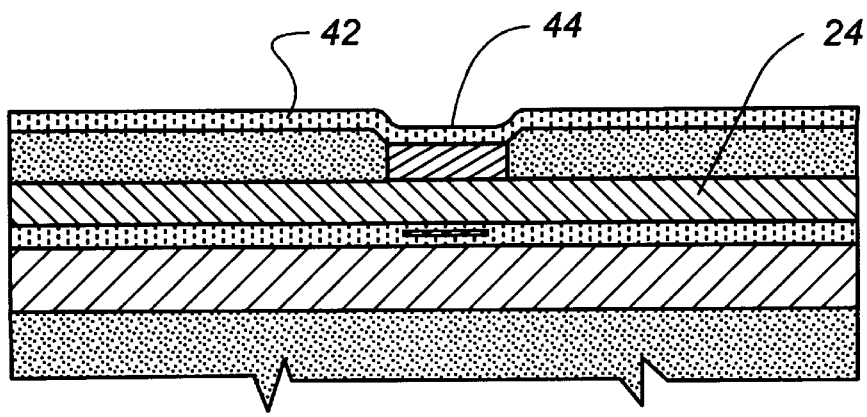
FIG. 2F is a cross sectional view of the partially formed MR head as in FIG. 2E after deposition of a gap layer.

Next the upper surface of the insulating layer 36 is lapped to a smooth flat surface with the pole tip 32 extending flush and coplanar with the lapped surface of the insulating layer 36. The partial head is then subjected to an ion beam etch indicated by the arrows 38 directed normal to the lapped surface the insulating layer 36. This ion beam etch is essentially a broad wash beam of preferably argon ions having a generally uniform distribution density panned over the exposed surface of both the insulating layer 36 and the exposed pole tip 32. The rate of ablation of the insulating layer 36 is slower than that of the of the pole tip 32. In addition, ablation is higher at the corners formed as the tip recedes below the surface of the insulating layer 36. Consequently, as the pole tip 32 is uniformly worn away and thus recedes, a channel with steeply slanted sides 40 is formed immediately above the pole tip 32 as shown in FIG. 2E.

Figure 2G:
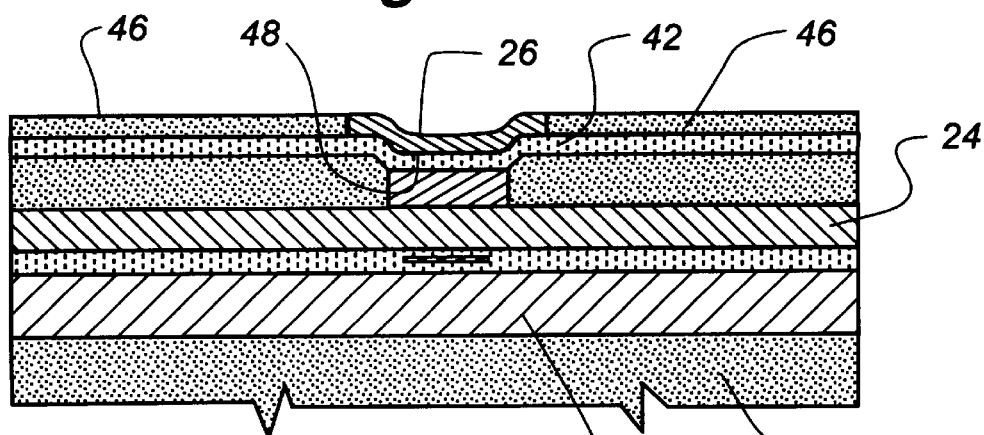
FIG. 2G is a cross sectional view of the partially formed MR head as in FIG. 2F after deposition of the photo resist to define the top pole.

Now a thin gap layer is deposited over the surface of the insulating layer 36 and the pole tip 32. This gap layer 42 his a uniform thickness and therefore forms a channel 44 aligned with the pole tip 32. A photoresist 46 is then deposited over the gap layer and masked to form an outline of the top pole 26, exposed to light, and the exposed (or unexposed) resist removed, leaving behind the area above the pole tip 32 for deposition of the top pole 26. The top pole 26 is then electrodeposited as is shown in FIG. 2G.

Finally, the photoresist 46 is removed, leaning behind the top pole 26 with a tip 48 accurately aligned opposite the pole tip 32. When the top pole 26 is constructed in this manner, it makes no difference what the shape of the shared pole tip is, the top pole tip 48 will always be directly aligned with the raised pole tip 32. The width of the pole 26 above the tip 48 is not critical, as the pole tip 48 is the focus of magnetic flux passing through the gap layer 42.

Figure 2H:
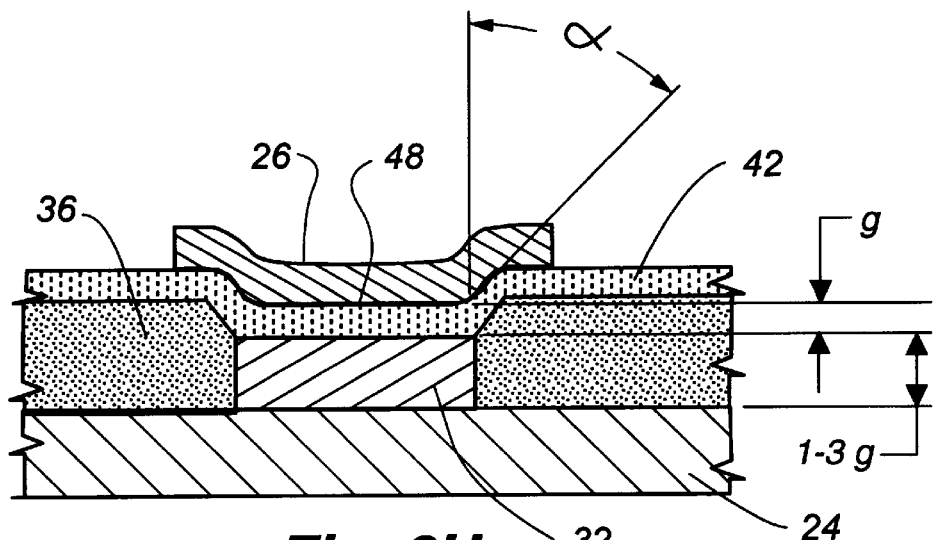
FIG. 2H is an enlarged cross sectional air bearing surface view of the completed MR head after deposition of the top pole and removal of the photo resist.

Referring now to FIG. 2H, it has been found that to optimally reduce smiles and excess fringing, there is a unique relationship between the angle alpha and the shape and size of the pole tip 48. It has been found that an optimum configuration is provided when the height of the pole tip 32 is one to three times the gap thickness (g) and the angle alpha ($\alpha$) between a line normal to the surface of the shared shield and the slope of the side wall of the channel preferably is less than 45°. The height of the top pole tip 48, i.e. the depth of the groove or channel formed by the gap layer 42 over the pole tip 32 is preferably greater than 0.5 g and preferably greater than 0.75 g.

While there have been described above the principles of the present invention in conjunction with specific magnetoresistive head transducer configurations and storage media applications, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom. The present invention may be practiced otherwise than as specifically described above. Many changes, alternatives, variations, and equivalents to the various structures shown and described will be apparent to one skilled in the art. Accordingly, the present invention is not intended to be limited to the particular embodiments illustrated but is intended to cover all such alternatives, modifications, and equivalents as may be included within the spirit and broad scope of the invention as defined by the following claims. All patents, patent applications, and printed publications referred to herein are hereby incorporated by reference in their entirety.

What is claimed is:

1. A method of forming a top pole member in a magnetic recording head having a bottom shield member, a bottom insulating layer on said bottom shield member, and a shared shield member over said bottom shield member on a ceramic substrate comprising the steps of:

depositing a ferromagnetic material on said shared shield member forming a shared pole tip;

depositing a top insulating layer on and over said shared shield member and said shared pole tip;

mechanically forming a planar surface on said top insulating layer over said shared shield member exposing said shared pole tip flush with said planar surface;

recessing said pole tip below said planar surface;

depositing a gap layer over said planar surface of said top insulating layer and said recessed pole tip forming a channel over said recessed pole tip; and depositing a top pole member into and over said channel over said recessed pole tip.

2. The method according to claim 1 wherein said gap layer has a thickness and said pole tip has a height between one and three times said gap layer thickness.

3. The method according to claim 1 wherein said top insulating layer surface adjacent said recessed shared pole tip slopes towards said pole tip at an angle of less than 45 degrees with respect to a line normal to the surface of said shared shield member.

4. The method according to claim 1 wherein said step of depositing said shared pole tip comprises the steps of:

depositing a photoresist layer on said shared shield member;

positioning a photolithographic mask over said photoresist to outline a shared pole tip location;

exposing said photoresist layer outlined by said mask to light;

removing said photoresist over said shared pole tip location to expose a portion of said shared shield member;

depositing a ferromagnetic material on said exposed shared shield member forming said shared pole tip; and removing remaining photoresist from said shared pole.

5. The method according to claim 4 wherein said recessing comprises exposing said top insulating layer and said exposed pole tip to an ion beam etch.

6. The method according to claim 1 wherein said recessing comprises exposing said top insulating layer and said exposed pole tip to an ion beam etch.

7. The method according to claim 6 wherein said ion beam etch is operable to ablate said pole tip faster than said top insulating layer.

8. The method according to claim 1 wherein said step of depositing a ferromagnetic material on said shared shield member further comprises selecting said ferromagnetic material having at least the same magnetic moment as said shared shield member.

9. A method of forming a top pole member in a magnetic recording head having a bottom shield member, a bottom insulating layer on said bottom shield member, and a shared shield member over said bottom shield members on a ceramic substrate, said bottom and shared shield member having a magnetoresistive element therebetween, said method comprising the steps of:

depositing a photoresist layer on said shared shield member;

positioning a photolithographic mask over said photoresist to outline a shared pole tip location;

exposing said photoresist layer outlined by said mark to light;

removing said photoresist over said shared pole tip location to expose a portion of said shared pole;

depositing a ferromagnetic material on said exposed shared pole forming a shared pole tip;

removing remaining photoresist from said shared shield member;

depositing a top insulating layer on and over said shared shield member and said shared pole tip;

mechanically forming a planar surface on said top insulating layer over said shared shield member exposing said shared pole tip flush with said planar surface;

subjecting said planar surface to an ion beam etch to recess said pole tip below said planar surface;

depositing a gap layer over said planar surface of said top insulating layer and said recessed pole tip forming a channel over said recessed pole tip; and depositing a top pole member into and over said channel over said recessed pole tip.

10. The method according to claim 9 wherein said gap layer has a thickness and said pole tip has a height between one and three times said gap layer thickness.

11. The method according to claim 9 wherein said top insulating layer surface adjacent said recessed shared pole tip slopes towards said shared pole tip at an angle of less than 45 degrees with respect to a line normal to the surface of said shared shield member.

12. The method according to claim 9 wherein said step of depositing a ferromagnetic material on said shared shield member further comprises selecting said ferromagnetic material having at least the same magnetic moment as said shared shield member.

13. A magnetoresistive read/write head, comprising a substrate member having a substrate surface;

a bottom shield member having a bottom shield surface and deposited on said substrate surface;

a bottom insulating layer having a bottom insulating surface and deposited on said bottom shield surface;

a magnetoresistive element suspended in said bottom insulating layer;

a shared shield member having a shared shield surface and deposited on said bottom insulating surface;

a top insulating layer having a top insulating surface and deposited on said shared shield surface;

a pole tip member within said top insulating layer having an upper pole tip surface and a lower pole tip surface, wherein said pole tip member is recessed below said top insulating surface and said lower pole tip surface abuts said shared shield surface;

a gap layer having a gap surface and deposited on said top insulating surface and said upper pole tip surface; and a top pole member deposited on said gap surface, wherein said top pole member is accurately aligned opposite said pole tip member.

14. The magnetoresistive read/write head of claim 13 wherein said gap layer has a gap layer thickness and wherein said pole tip member has a pole tip height greater than half of said gap layer thickness.

15. The magnetoresistive read/write head of claim 13 wherein said pole tip member is recessed below said top insulating surface at a recess angle less than 45 degrees with respect to a line normal to said shared shield surface.

16. The magnetoresistive read/write head of claim 13 wherein said pole tip member has at least the same magnetic moment as said shared shield member.

* * * * *

UNITED STATES PATENT AND TRADEMARK OFFICE
CERTIFICATE OF CORRECTION

PATENT NO. : 6,081,408
DATED : June 27, 2000
INVENTOR(S) : Charles Partee

Page 1 of 1

It is certified that error appears in the above-identified patent and that said Letters Patent is hereby corrected as shown below:

<u>Title page,</u>
Item [73] Assignee, Please delete "Masushita-Koto Buki Electronics Industries, Ltd." and substitute thereof -- Matsushita-Kotobuki-Electronics Industries, Ltd. --

Signed and Sealed this

Eleventh Day of September, 2001

*Attest:*

*Attesting Officer*

NICHOLAS P. GODICI
*Acting Director of the United States Patent and Trademark Office*